United States Patent [19]

Johnson et al.

[11] Patent Number: 4,973,402

[45] Date of Patent: Nov. 27, 1990

[54] FLOW RESTRICTOR AND STRAINER ASSEMBLY FOR A TOILET TANK FILL VALVE AND THE LIKE

[75] Inventors: Dwight N. Johnson, Carlsbad, Calif.; Donald C. Schrock, Carmel, Ind.

[73] Assignee: Masco Corporation of Indiana, Taylor, Mich.

[21] Appl. No.: 343,779

[22] Filed: Apr. 26, 1989

[51] Int. Cl.⁵ ............................................. B01D 21/30
[52] U.S. Cl. ...................... 210/136; 4/318;
4/DIG. 19; 137/403; 137/544; 210/411;
210/429; 210/488
[58] Field of Search ............. 4/286, 287, 292, 366,
4/DIG. 4, DIG. 19, 318; 137/403, 436, 544,
550; 210/456, 457, 136, 137, 418, 429, 488, 492,
497.3, 411, 459; 251/118

[56] References Cited

U.S. PATENT DOCUMENTS

| | | | |
|---|---|---|---|
| 492,161 | 2/1893 | Hill | 4/DIG. 4 |
| 1,188,371 | 6/1916 | Illg | 210/429 |
| 1,617,048 | 2/1927 | Gregory | 210/429 |
| 2,409,050 | 11/1968 | Weese | 251/118 |
| 2,647,636 | 8/1953 | Rafferty | 210/488 |
| 2,658,625 | 11/1953 | Rafferty | 210/497.3 |
| 3,037,633 | 6/1962 | Veitel et al. | 210/488 |
| 3,379,312 | 4/1968 | Brown | 210/457 |
| 3,397,794 | 8/1968 | Toth et al. | 210/488 |
| 3,497,070 | 2/1970 | Parkinson et al. | 210/457 |
| 4,473,470 | 9/1984 | Loutit | 210/497.3 |
| 4,574,826 | 3/1986 | Johnson | 137/436 |
| 4,596,269 | 6/1986 | Stephens | 137/436 |
| 4,646,779 | 3/1987 | Johnson | 137/436 |

OTHER PUBLICATIONS

Brochure of Filtertek, Inc., entitled "Molded Filters for Precise Particle Control", p. 16.
Brochure of Kuss Corporation entitled, "Molded Plastic Filters", Supplement A.

*Primary Examiner*—Frank Spear
*Assistant Examiner*—Joseph Drodge
*Attorney, Agent, or Firm*—Leon E. Redman; Malcolm L. Sutherland

[57] ABSTRACT

A fluid flow fill valve (10) has an elongated strainer member (40) with a plurality of axially extending flanges (44) each having alternating notches (48) and comb-like elements (46) which abut a complementarily tapered supply conduit wall (25) to provide an elongated strainer member along the conduit. The upstream end of the strainer member (40) has a nub (64) which is placed within an aperture (74) of flexible fluid flow restrictor member (66) to provide for a restrictive annular inlet to the strainer member (40). Strainer member (40) can be easily flushed by depressing and axially moving the strainer member downwardly such that a clearance (84) is formed between the comb-like element (46) and the tapered wall (25) of conduit (24).

12 Claims, 2 Drawing Sheets

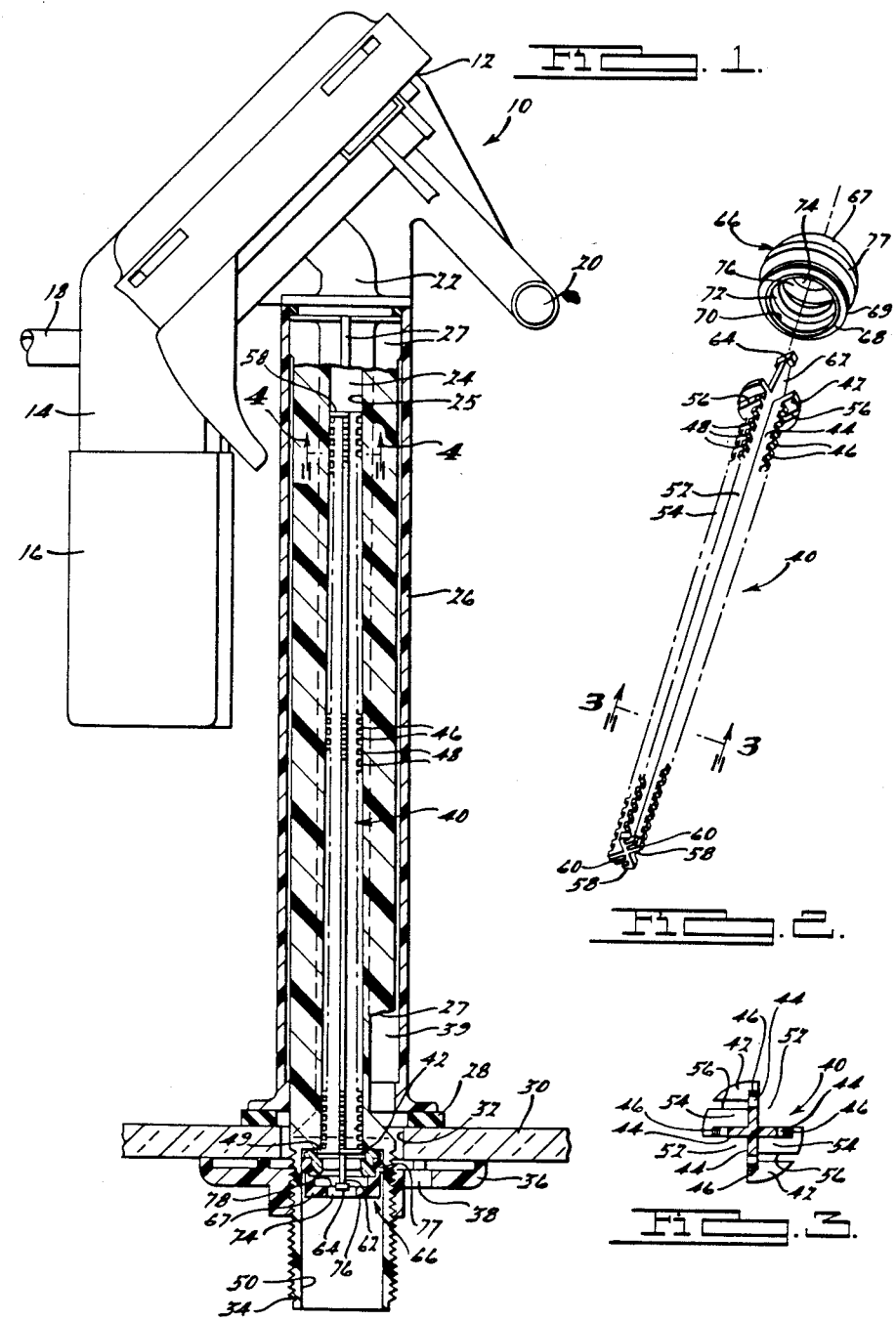

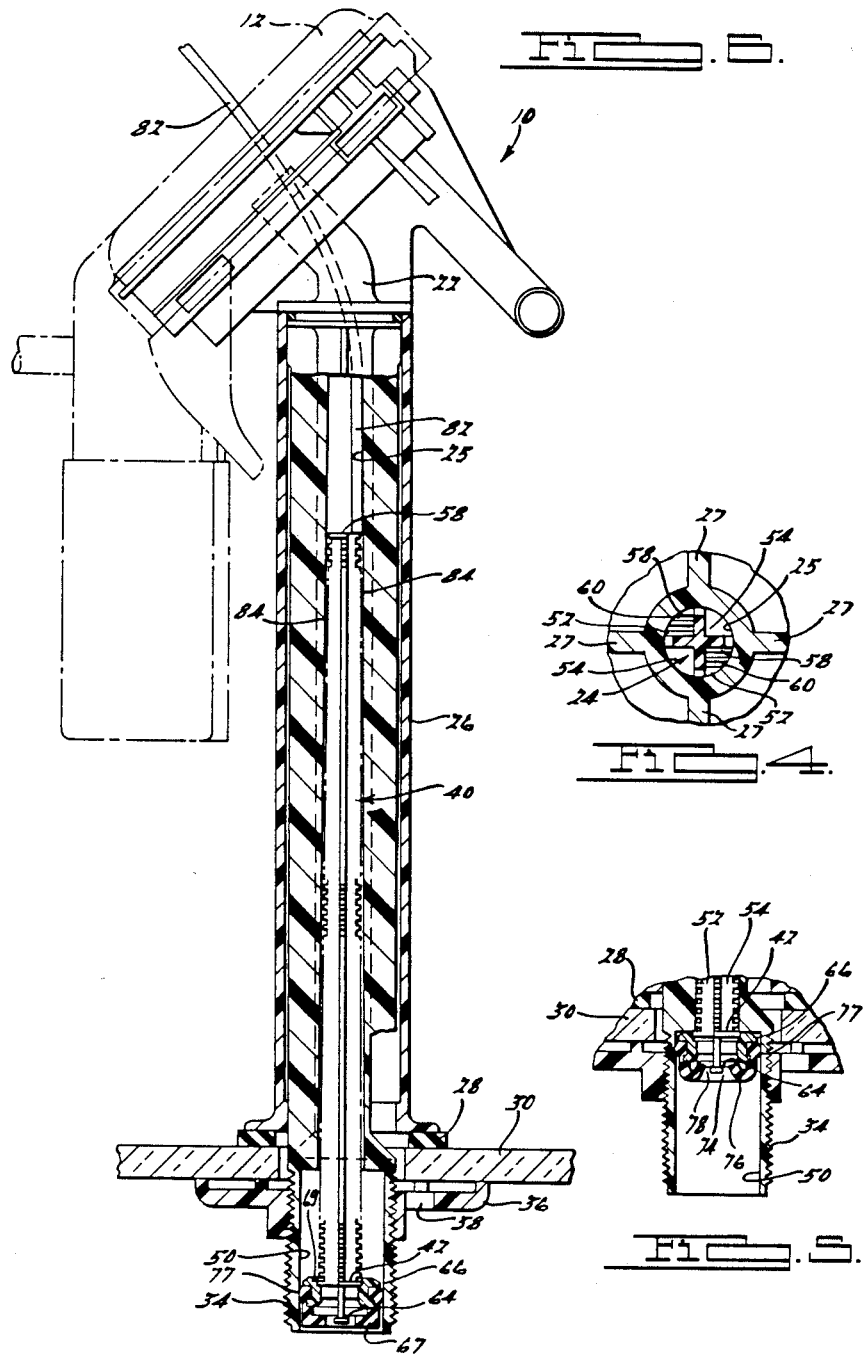

4,973,402

FLOW RESTRICTOR AND STRAINER ASSEMBLY FOR A TOILET TANK FILL VALVE AND THE LIKE

TECHNICAL FIELD

This invention relates to a toilet tank fill valve and more particularly to a flow restrictor and strainer assembly for the riser conduit of the fill valve.

BACKGROUND OF THE INVENTION

Many fill valves for toilet tanks have a pilot operated main valve which has a small flexible valve diaphragm that has a central small passage therethrough for allowing water pressure to seep behind the valve, thereby pressing the valve against a valve seat to shut off the main fill valve. A chamber behind the main valve diaphragm has a small relief aperture which when open alleviates pressure in the chamber. When it is desired for the main valve to be closed, that relief aperture is closed off by a pad operated by a floating ball cock or a diaphragm responsive to air pressure or water pressure.

The relief hole in the chamber and passage through the main valve diaphragm are small. It is therefore important that the water supply through the fill valve is clean, absent any large particles that may block the aperture or passage or otherwise interfere with the function of the fill valve parts. It is common to have a screen mounted at the upstream end of the fill valve riser conduit. These screens, when clean, work fine. However, once the screens have been blocked by particles and other debris, one must unhook the fill valve from the water supply conduit. The water supply conduit is often located at the bottom of the tank behind the bowl in an often tight and uncomfortable position. Because of the unpleasantness of unlinking the supply conduit, the screens are often left unclean which unduly blocks the water supply to the fill valve and consequently slows the flow to refill the tank. Consequently, a toilet refill cycle is unduly extended.

U.S. Pat. Nos. 4,574,826 and 4,646,779 issued to Dwight N. Johnson on Mar. 11, 1986 and Mar. 3, 1987, respectively, disclose an adjustable fill valve which has a telescopic riser conduit which is separable from the lower riser conduit section that is mounted at the bottom of the tank. The upper section has a basket strainer attached to the bottom end of the telescopic riser conduit. The basket strainer can be cleaned when the fill valve is disassembled and the telescopic upper riser conduit is removed from the lower conduit section. A flow restrictor is also mounted at the bottom end of the telescopic conduit section.

What is needed is a high capacity strainer which can strain a large amount of debris without the need for cleaning and in which the strainer can be cleaned or flushed without disassembly of the supply conduit or removal of the strainer from the riser conduit.

SUMMARY OF THE INVENTION

In accordance with one aspect of the invention, a fill valve includes a main valve section with an elongated stem section which supports the main valve section. The stem section has a riser conduit with an outlet operably connected to the main valve section and an inlet. An elongated strainer member is operably fitted in the riser conduit between a normal straining position and movable to a flushing position which allows water flowing through the conduit to flush the strainer member clean. The main valve is removable to allow axis to the conduit outlet to allow a tool to enter the conduit to move the strainer member to the flushing position. Desirably, the conduit is tapered toward the outlet. It is also preferable that the elongated strainer member has a flow restrictor mounted at its upstream end.

The plurality of strainer elements are longitudinally spaced along the elongated strainer member. The downstream elements are shorter than the upstream elements to give the elongated strainer member a tapered look. The edges of the strainer elements abut the inside tapered wall of the conduit.

In accordance with another aspect of the invention, a strainer for liquid carrying conduit has an elongated member with an inlet passage at one end and an outlet passage at the other end with at least one radially extending flange wall axially extending from the inlet passage to the outlet passage and having a radially outer end abutable with a conduit wall. The flange wall includes strainer elements for straining liquid passing from the inlet passage to the outlet passage. Strainer elements include comb-like elements axially spaced along the edge of the flange wall alternating with axially spaced notches. The flange wall is tapered toward the outlet passage to be abutable against a complementarily shaped tapered conduit wall.

It is desirable that the strainer is assembled with a flow restrictor at the inlet end in which the elongated member has a nub axially positioned in a central opening formed by an annular member to form a restrictive annular passage.

Preferably the restrictive annular member has a flexible annular disc element that can axially move with respect to the nub.

In this fashion a high capacity strainer and flow restrictor assembly is easily mountable in a fill valve. It is also movable to a flush position where dirt and debris can be flushed and cleansed from the elongated filter strainer member. The flow restrictor also regulates the flow to the filter strainer member and to the fill valve. The nub integral with the elongated member forms an operable part of the flow restrictor.

BRIEF DESCRIPTION OF THE DRAWINGS

Reference now is made to the accompanying drawings in which:

FIG. 1 is a partially segmented side elevational view of a fill valve according to one embodiment of the invention;

FIG. 2 is an exploded perspective view of the strainer element and flexible flow restrictor as viewed from the top end of the strainer element;

FIG. 3 is a cross-sectional view along the line 3—3 shown in FIG. 2;

FIG. 4 is a cross-sectional view taken along the line 4—4 in FIG. 1;

FIG. 5 is a fragmentary view of the inlet end of the strainer element and the annular member during high fluid pressure flow; and FIG. 6 is a partially segmented side elevational view of the strainer element being moved to the flush position.

DETAILED DESCRIPTION OF THE PREFERRED EMBODIMENT

Referring now to FIG. 1, a fill valve 10 has a main valve section 12 in air pressure communication with a probe member 14 which is mounted to a cup-like element 16 and an outlet pressure relief conduit 18. Description of the main valve section 12 is described in detail in previously mentioned U.S. Pat. No. 4,574,826 to Dwight Johnson which is incorporated herein by reference; particularly the section from column 5, line 1 to column 9, line 68 and the accompanying drawings. The function of the cup-like element is described in detail in copending application Ser. No. 07/332,071, filed Apr. 3, 1989 by Dwight Johnson and is also incorporated herein by reference, particularly the Detailed Description of the Preferred Embodiment and the accompanying drawings. The pressure relief tube 18 is described in detail in copending application Ser. No. 07/343,970, filed simultaneously, by Dwight Johnson which is also incorporated herein by reference, particularly the Detailed Description of the Preferred Embodiment and accompanying drawings.

The main valve 12 has an outlet fill conduit 20 and an inlet 22 which has a tapered conduit section 24 defined by tapered frusto-conical wall 25. A cylindrical shield 16 is placed about the conduit 24 and is mounted on the seal 28 on tank bottom 30 which has an aperture 32 therethrough. A threaded end 34 of the fill valve extends through aperture 32. A threaded nut 36 engages end 34 and securely mounts the stem onto the tank bottom 30. An aperture 38 is through the nut 36 and provides a passageway through the aperture opening to the air passage 39 between shield 26 and conduit wall 25. Longitudinal support ribs 27 extend axially along the exterior of wall 25.

The elongated strainer element 40 as clearly shown in FIG. 2 is fitted within the tapered conduit 24 such that its lower flange 42 abuts against bottom shoulder 49 of tapered conduit 24. The elongated strainer 40 has four elongated flanges 44 each extending from the central axis of the member radially outward. The flanges 44 are aligned such that each aligned pair form a flat wall that longitudinally extends along conduit 24 and radially cuts across conduit 24 such as a chord or diameter. The outer edge of each flange 44 has alternating notches 48 and comb-like elements 46 which abut against the tapered wall 25 of the conduit 24 as shown in FIG. 1. The adjacent flanges 44 define alternating inlet channels 52 and outlet channels 54 as clearly shown in FIG. 3. Each flange 44 is substantially perpendicular with respect to its adjacent flange 44 such that inlet channels 52 are the same size as outlet channels 54. Inlet flange 42 has a slot 56 which is the same width as the notches 48. As shown in FIG. 4 the inlet channels 52 have at their downstream end top collars 58 with two slots 60 therethrough also being the same width as the notches 48. Inlet channels 52 are open to the upstream end and outlet channels 54 are open to the downstream end of the conduit 24.

The upstream end of the elongated strainer member 40 has an end protrusion 62 with a nub 64 at the bottom end. A flow restrictor 66 has an elastomeric flexible member 67 and a rigid plastic member 69. The flexible member 67 has a disc shaped end 76 with a hole 74 therethrough. Side cylindrical wall 70 receives the plastic member 79. An outer shoulder 77 on wall 70 sealingly abuts the interior wall 50 of threaded end 34.

The plastic member 69 has a frusto-conical end 68 with an undercut 73 to act as a seat for wall 70. An inner shoulder 72 is recessed with respect to the end 68 to form a space for the lower flange 42 of element 40.

During no flow or low pressure the flow restrictor is in the position shown in FIG. 1 with the radially extending shoulder 72 spaced from the bottom flange 42. The nub 64 is positioned at the top of hole 74. During high flow, as shown in FIG. 5, the flexible flange 76 bends upwardly such that hole 74 and nub 64 form a passage 78 that decreases in cross-sectional area to cause a further relative restriction during high pressure flow conditions. The lower end 71 of plastic member 69 forms a support stop for the elastomeric member 67 during high flow conditions.

During fluid flow through the conduit, any large particles which may cause damage or inoperation of the main valve 12 will be trapped by the alternating notches 48 and comb-like elements 46 or by slots 56 or 60. Water must either pass through one of the slots 56 or 60 or through one of the notches 48 from the upstream end to the downstream end of the strainer 40. After a period of time in a dirty water situation enough of the notches and slots may be blocked by debris to cause a noticeable decrease of water flow through the conduit 24 such that the amount of time to refill the tank is noticeably increased.

It may then be desirable to flush the strainer element 40 clean. This can easily be done by removal of the main valve upper section that houses the probe 14 and exposure of the outlet end of conduit 22 as illustrated in FIG. 6. The water supply is shut off before removal of the main valve section 12. A semi-flexible plastic rod 82 is then inserted into the outlet end 81 and past through the conduit 24 until it abuts the top shoulders 58 of the strainer member 40. Further downward motion of rod 82 will cause the frusto-conical strainer 40 to move downward in the frusto-conical conduit section 24 to cause a gap 84 to develop between the downstream comb-like elements 46 and the wall 25 which also increases the effective length of each notch 48. The upstream comb-like elements 48 enter into wider diameter threaded section 34. The water is then turned on with the strainer being kept in this position and water flushes the debris from the notches 48 and through the gap 84 such that the strainer element 40 is flushed clean. It may be desirable for a shield or cup member to prevent water exiting from outlet 81 from splashing the operator. After the flush, the water supply is then shut off again, the rod 82 is removed, the main valve section 12 is reinstalled, and the water supply is then turned on. Water pressure moves the flow restrictor element 66 and strainer 40 back up to the operable position shown in FIG. 1.

The elongated strainer 44 by having a plurality of notches 48 extending substantially along the longitudinal edge of four flange walls of conduit 24 provides a high capacity strainer that does not need frequent cleansing flushes so that the inconvenience of cleaning it is kept to a minimum. However, when the necessity arises to flush, the strainer is easily flushed by a simple operation. Firstly, shut off the supply water, remove the main valve assembly 12, insert a simple flexible plastic rod within the conduit, press the elongated member downward and then turn on the water to flush the debris outward.

Furthermore, the elongated strainer element is combined in function with a fluid flow restrictor which regulates the amount of water flowing through the fill valve to provide for consistently repetitive functions of the fluid flow fill valve.

Variations and modifications of the invention are contemplated without departing from its spirit as defined the appended claims.

What is claimed is:

1. A strainer for a liquid carrying conduit, said strainer characterized by:
   an elongated member having an inlet passage means at one end and an outlet passage means at a second end;
   at least one flange wall axially extending from said inlet passage means to said outlet passage means with said inlet passage means and outlet passage means on opposite sides of said flange wall;
   said at least one flange wall having a radially outer edge abutable against an interior wall of the conduit;
   said flange wall including straining means having axially spaced alternating notches and comb-like elements along said radially outer edge of said at least one flange wall, with said comb-like elements being abutable against an interior wall of said conduit, and said notches defining flow passages, liquid passing from said inlet passage means through said notches in said flange wall and to said outlet passage means, and being strained by said notches.

2. A strainer as defined in claim 1 further characterized by:
   said at least one flange wall being inwardly tapered toward the outlet passage means.

3. A flow restrictor and strainer assembly for a liquid carrying conduit, said assembly characterized by:
   an elongated member having at least one wall that axially extends within said conduit and radially extends across said conduit;
   said wall having straining means including axially spaced alternating notches and comb-like elements formed along a radially outer edge of said at least one wall, with said comb-like elements abutting an interior wall of said conduit, said notches straining liquid;
   an annular member having a central opening positioned at one end of said elongated member and having an outer periphery sealingly abutable against an interior wall of said liquid carrying conduit;
   said elongated member having a nub axially positioned in said central opening and forming with said annular member a restrictive annular passage.

4. A flow restrictor and strainer assembly as defined in claim 3 further characterized by:
   said at least one wall being inwardly tapered toward the outlet passage means.

5. A flow restrictor and strainer assembly as defined in claim 4 further characterized by:
   said elongated member having a collar near said one end said annular member having a radial shoulder axially spaced from said collar of said elongated member and abutable with said collar when said elongated member is axially moved toward said shoulder.

6. A flow restrictor and strainer assembly as defined in claim 5 further characterized by:
   said annular member having a flexible annular section about said central hole and being flexible in an axial direction about said nub.

7. A fill valve for a toilet tank, said valve characterized by:
   a main valve section;
   an elongated stem section which supports the main valve section;
   said stem section having a conduit with an outlet operably connected to said main valve section and an inlet;
   an elongated strainer member operably fitted in said conduit between a normal straining position and movable to a flushing position within said conduit which allows water flowing through said conduit to flush said strainer member clean;
   access means for allowing access to said conduit outlet to move said strainer member to said flushing position.

8. A fill valve as defined in claim 7 further characterized by:
   said elongated strainer member having a flow restrictor mounted at an upstream end thereof; and
   a plurality of strainer elements longitudinally disposed along said strainer member.

9. A fill valve as defined in claim 7 further characterized by:
   said elongated strainer member being inwardly tapered toward said outlet;
   said conduit being inwardly tapered toward said outlet;
   said elongated strainer member having its strainer elements abutting a wall of said conduit when in the normal straining position and being movable upstream to a flushing position such that the strainer elements become spaced from said wall of said conduit.

10. A fill valve as defined in claim 7 further characterized by:
    said access means including said main valve being removably mounted on said stem section such that it can be removed and expose said outlet of said conduit such that said elongated strainer member can be moved by a rod means passing through said outlet.

11. A strainer assembly received in a liquid carrying conduit, said assembly characterized by:
    a conduit having an inner periphery;
    a conduit inlet connection to connect a source of liquid to said conduit, and a conduit outlet connection connecting said conduit to a downstream use of said liquid;
    said conduit receiving an elongated member extending along a central axis, at least two walls extending radially outwardly from said central axis, said at least two walls extending radially outwardly of said central axis to contact said inner periphery, said at least two walls dividing a cross-section of said conduit perpendicular to said central axis into at least one inlet passage and at least one outlet passage, said elongated member having a first end adjacent to said conduit inlet connection and a second end adjacent to said conduit outlet connection, said elongated member having an outlet cover at said first end closing off said at least one outlet passage, said cover having at least one notch for passage of liquid therethrough, said inlet passage being uncovered at said first end;
    said elongated member having an inlet cover closing off said at least one inlet passage at said second end, said inlet cover also having at least one notch for passage of liquid therethrough, said outlet passage being uncovered at said second end; and
    said at least two walls having comb portions in contact with said inner periphery of said conduit and notches spaced from said inner periphery of said conduit, such that liquid flowing into said conduit inlet connection passes either through said inlet passage, or said notch in said outlet cover, a portion of said liquid passing into said inlet passage passing through said conduit and through said at least one notch in said inlet cover, the remainder of the liquid in said inlet passage passing through said notches in said at least two walls of said elongated member, such that all liquid entering said conduit passes through at least one notch or slot before reaching said conduit outlet to strain the liquid.

12. A strainer assembly as recited in claim 11, wherein there are four of said walls, two of said inlet passages and two of said outlet passages.

* * * * *